US012541784B2

(12) United States Patent
Gustin et al.

(10) Patent No.: US 12,541,784 B2
(45) Date of Patent: Feb. 3, 2026

(54) ARTIFICIAL INTELLIGENCE BASED SYSTEM AND METHODS FOR PREDICTING SKIN ANALYTICS OF INDIVIDUALS

(71) Applicant: The Procter & Gamble Company, Cincinnati, OH (US)

(72) Inventors: Jennifer Joan Gustin, Cincinnati, OH (US); Susanna Brink, Kronau (DE); Ping Hu, Mason, OH (US); Li Sun, Cincinnati, OH (US); Andrew Nicholas Carr, Maineville, OH (US); Frank Peter Kressmann, Eschborn (DE); Donald Carroll Roe, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 252 days.

(21) Appl. No.: 18/207,179

(22) Filed: Jun. 8, 2023

(65) Prior Publication Data

US 2023/0401625 A1 Dec. 14, 2023

Related U.S. Application Data

(60) Provisional application No. 63/350,466, filed on Jun. 9, 2022.

(51) Int. Cl.
*G06Q 30/0601* (2023.01)
*G06V 10/56* (2022.01)
(Continued)

(52) U.S. Cl.
CPC ..... *G06Q 30/0631* (2013.01); *G06Q 30/0621* (2013.01); *G06Q 30/0643* (2013.01);
(Continued)

(58) Field of Classification Search
CPC .... G06Q 30/0631; G16H 80/00; G06V 20/20; G06V 10/56; G06V 10/751
(Continued)

(56) References Cited

U.S. PATENT DOCUMENTS 10,736,579 B2 8/2020 Van Berkel-wijnen
2008/0294012 A1* 11/2008 Kurtz ............... A61B 5/444
600/300

(Continued)

OTHER PUBLICATIONS

PCT Search Report and Written Opinion for PCT/US2023/024772 dated Sep. 14, 2023, 17 pages.
Basil Mustafa et al: "Supervised Transfer Learning at Scale for Medical Imaging", Jan. 18, 2021, 20 pages.
Judit Kuszko, "Emerging Trends: Skin Checking Algorithms—The Medical Futurist", Retrieved online from: URL:https://medicalfuturist.com/skin-checking-algorithms/, Jun. 17, 2021, 06 pages.

*Primary Examiner* — Hiep V Nguyen
(74) *Attorney, Agent, or Firm* — Daniel S. Albrecht

(57) ABSTRACT

A digital imaging method of analyzing pixel data of an image of a diaper change region associated with an individual for determining an individual-specific diaper change region skin characteristic is provided, including aggregating training images of diaper change regions of individuals; training, with pixel data of the training images, a diaper change region skin model operable to determine diaper change region skin characteristics associated with a diaper change region based on the pixel data of the diaper change region; receiving an image of an individual captured by a digital camera; analyzing, by the diaper change region skin model, the image captured by the digital camera to determine an individual-specific diaper change region skin characteristic; generating an individual-specific recommendation designed to address a feature identifiable within pixel data of the individual's skin based on the individual-specific diaper change region skin characteristic; and providing the individual-specific recommendation via a user interface.

50 Claims, 4 Drawing Sheets

(51) Int. Cl.
  *G06V 10/75*   (2022.01)
  *G06V 10/774*  (2022.01)
  *G06V 20/20*   (2022.01)
  *G06V 40/10*   (2022.01)
  *G16H 80/00*   (2018.01)

(52) U.S. Cl.
  CPC ............ *G06V 10/56* (2022.01); *G06V 10/751* (2022.01); *G06V 10/774* (2022.01); *G06V 20/20* (2022.01); *G06V 40/10* (2022.01); *G16H 80/00* (2018.01)

(58) Field of Classification Search
  USPC ............................................................ 705/2
  See application file for complete search history.

(56)  References Cited

U.S. PATENT DOCUMENTS

| | | | |
  |---|---|---|---|
  | 2013/0296739 A1* | 11/2013 | Schultz | G01N 33/528 |
  | | | | 600/573 |
  | 2017/0000406 A1* | 1/2017 | Schnidar | A61B 5/441 |
  | 2019/0060142 A1 | 2/2019 | Okuda et al. | |
  | 2019/0216334 A1 | 7/2019 | Zhou | |
  | 2020/0143516 A1* | 5/2020 | Martin | G06T 3/60 |

* cited by examiner

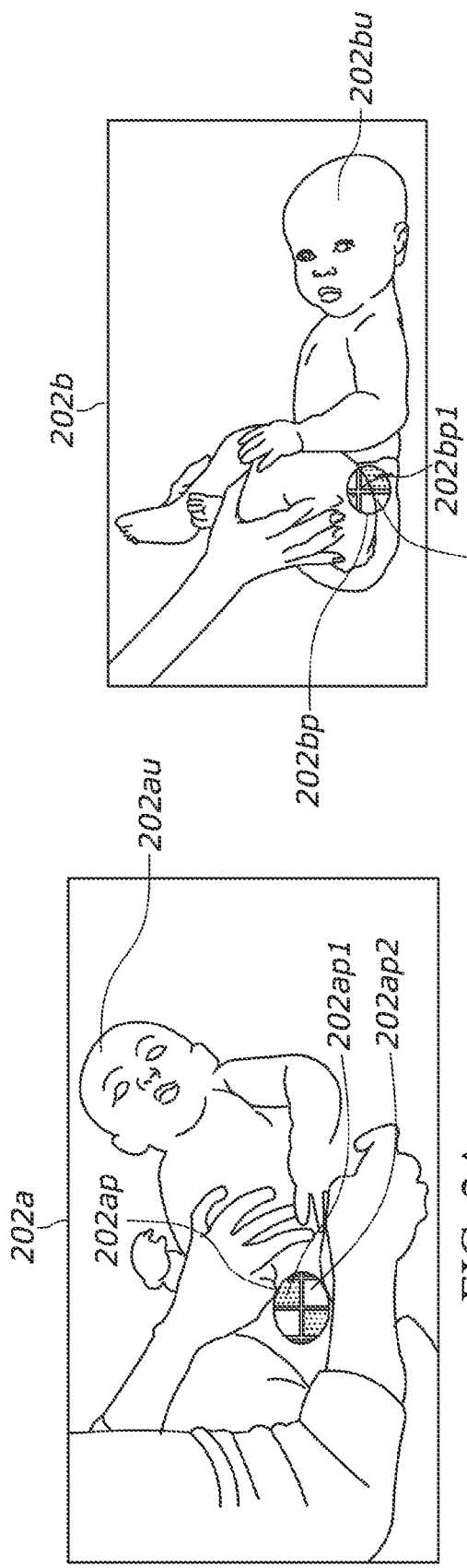
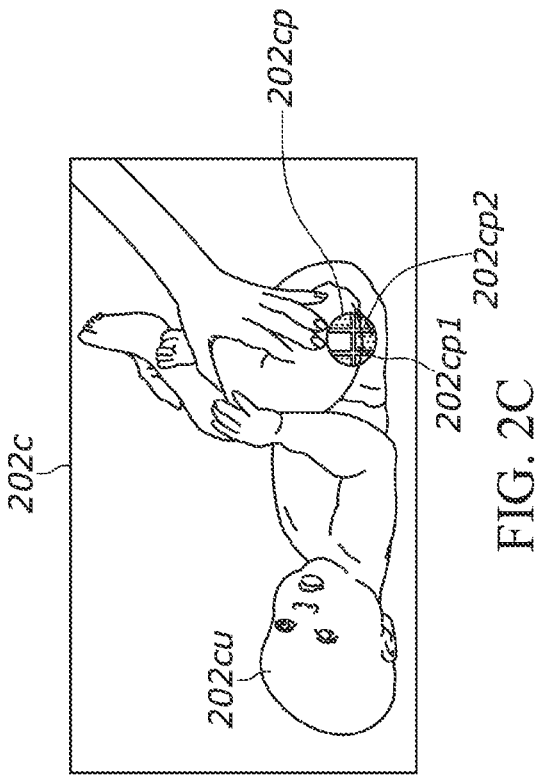
FIG. 2A
FIG. 2B
FIG. 2C

ARTIFICIAL INTELLIGENCE BASED SYSTEM AND METHODS FOR PREDICTING SKIN ANALYTICS OF INDIVIDUALS

CROSS REFERENCE TO RELATED APPLICATIONS

This application claims the benefit, under 35 U.S.C. § 119(e), of U.S. Provisional Application No. 63/350,466, filed Jun. 9, 2022, which is incorporated by reference herein in its entirety.

FIELD

The present disclosure generally relates to digital imaging systems and methods, and more particularly to, digital imaging systems and methods for analyzing pixel data of at least one image of a diaper change region associated with an individual for determining an individual-specific diaper change region skin characteristic.

BACKGROUND

Users of absorbent articles experience issues or concerns related to the use of the absorbent article, the substances the articles are designed to absorb, or health of the users themselves. For example, generally, new parents, or otherwise guardians or caretakers, can experience a multitude of issues when learning to care for an infant or other individuals in need of care. One such issue includes managing the often sensitive skin of a newborn child or other who uses diapers. Thus problems with infant or individual development, including health, safety, wellness, and/or sanitary situations or issues, can arise, including over time, where parents or other guardians fail to recognize such skin characteristics or changes in such skin characteristics specific to a given infant, child, or other individual, such as various skin conditions or skin concerns, including diaper rashes, as well as other skin irritation, skin dryness, skin erythema, etc., each of which can affect and be detrimental to the health of an infant or other individual.

Prior art methods for treating such issues, including manual instruction provided to parents, guardians and/or caregivers for changing diapers, and utilizing wipes, lotions, creams, powders, etc., can be time consuming and/or error prone (and possibly negative). In addition, a parent or caretaker, following such prior art methods, may attempt to empirically experiment with various products or techniques, but may fail to achieve satisfactory results or may cause possible negative side effects, impacting the health or safety of a specific infant or individual.

For the foregoing reasons, there is a need for digital imaging systems and methods for analyzing pixel data of at least one image of a diaper change region associated with an individual for determining an individual-specific diaper change region skin characteristic.

SUMMARY

Generally, as described herein, the digital imaging systems and methods for analyzing pixel data of an image of an individual's diaper change region (i.e., an image showing the individual's skin in a region of the individual's body associated with diaper changes) for determining an individual-specific diaper change region skin characteristic provide a digital imaging and artificial intelligence (AI) based solution for overcoming skin conditions and/or skin concerns that arise in individuals who wear absorbent articles, such as diapers. The digital systems and methods allow a user to submit a specific individual image to imaging server(s) (e.g., including its one or more processors), or otherwise a computing device (e.g., such as locally on the user's mobile device), where the imaging server(s) or user computing device implements or executes a diaper change region skin model trained with pixel data of potentially 10,000 (or more) images of individuals. The diaper change region skin model may generate, based on a determined individual-specific diaper change region skin characteristic, an individual-specific electronic recommendation designed to address at least one feature identifiable within the pixel data comprising at least a portion of the individual's diaper change region. For example, the at least one feature can comprise pixels or pixel data indicative of particular skin conditions, as well as the number of skin conditions, the severity of any skin conditions, etc. In some embodiments, the individual-specific recommendation (and/or product specific recommendation) may be transmitted via a computer network to a user computing device of the user for rendering on a display screen. In other embodiments, no transmission to the imaging server of the user's specific image occurs, where the individual-specific recommendation (and/or product specific recommendation) may instead be generated by the diaper change region skin model, executed and/or implemented locally on the user's mobile device and rendered, by a processor of the mobile device, on a display screen of the mobile device. In various embodiments, such rendering may include graphical representations, overlays, text and/or voice annotations, and the like for addressing the feature in the pixel data.

More specifically, as described herein, a digital imaging method of analyzing pixel data of at least one image of a diaper change region associated with an individual for determining an individual-specific diaper change region skin characteristic is provided, the digital imaging method comprising the steps of: aggregating, at one or more processors communicatively coupled to one or more memories, a plurality of training images of one or more diaper change regions associated with a respective plurality of individuals, each of the training images comprising pixel data of a diaper change region associated with a respective individual; training, by the one or more processors, with the pixel data of the plurality of training images, a diaper change region skin model operable to determine diaper change region skin characteristics associated with a diaper change region based on the pixel data of the diaper change region; receiving, at the one or more processors at least one image of an individual, the at least one image captured by a digital camera, and the at least one image comprising pixel data of the diaper change region associated with the individual; analyzing by the diaper change region skin model executing on the one or more processors, the at least one image captured by the digital camera to determine an individual-specific diaper change region skin characteristic; generating, by the one or more processors, based on the individual-specific diaper change region skin characteristic, at least one individual-specific recommendation designed to address at least one feature identifiable within the pixel data of the individual's skin; and providing, via a user interface of a user computing device, the at least one individual-specific recommendation.

In addition, as described herein, a digital imaging system is provided, configured to analyze pixel data of at least one image of a diaper change region associated with an individual for determining an individual-specific diaper change region skin characteristic, the digital imaging system comprising: an imaging server comprising a server processor and a server memory; an imaging application (app) configured to execute on a user computing device comprising a device processor and a device memory, the imaging app communicatively coupled to the imaging server; and a diaper change region skin model trained with pixel data of a plurality of training images of one or more diaper change regions associated with a respective plurality of individuals, and operable to determine diaper change region skin characteristics associated with a diaper change region based on the pixel data of the diaper change region, wherein the diaper change region skin model is configured to execute on the server processor or the device processor to cause the server processor or the device processor to: receive at least one image of an individual, the at least one image captured by a digital camera, and the at least one image comprising pixel data of the diaper change region associated with the individual; analyze, by the diaper change region skin model, the at least one image captured by the digital camera to determine an individual-specific diaper change region skin characteristic; generate, based on the individual-specific diaper change region skin characteristic, at least one individual-specific recommendation designed to address at least one feature identifiable within the pixel data of the individual's skin; and provide, via a user interface of a user computing device, the at least one individual-specific recommendation.

Further, as described herein, a tangible, non-transitory computer-readable medium is provided, storing instructions for analyzing pixel data of at least one image of a diaper change region associated with an individual for determining an individual-specific diaper change region skin characteristic, that when executed by one or more processors cause the one or more processors to: aggregate, at one or more processors communicatively coupled to one or more memories, a plurality of training images of one or more diaper change regions associated with a respective plurality of individuals, each of the training images comprising pixel data of a diaper change region associated with a respective individual; train, by the one or more processors, with the pixel data of the plurality of training images, a diaper change region skin model operable to determine diaper change region skin characteristics associated with a diaper change region based on the pixel data of the diaper change region; receive, at the one or more processors at least one image of an individual, the at least one image captured by a digital camera, and the at least one image comprising pixel data of the diaper change region associated with the individual; analyze, by the diaper change region skin model executing on the one or more processors, the at least one image captured by the digital camera to determine an individual-specific diaper change region skin characteristic; generate, by the one or more processors, based on the individual-specific diaper change region skin characteristic, at least one individual-specific recommendation designed to address at least one feature identifiable within the pixel data of the individual's skin; and provide, via a user interface of a user computing device, the at least one individual-specific recommendation.

In accordance with the above, and with the disclosure herein, the present disclosure includes improvements in computer functionality or improvements to other technologies at least because the disclosure describes that, e.g., an imaging server, or other computing device (e.g., a user computer device), is improved where the intelligence or predictive ability of the imaging server or computing device is enhanced by a trained (e.g., machine learning trained) diaper change region skin model. The diaper change region skin model, executing on the imaging server or computing device, is able to accurately identify, based on pixel data of other individuals, an individual-specific diaper change region skin characteristic and an individual-specific electronic recommendation designed to address at least one feature identifiable within the pixel data of a specific individual's diaper change region. That is, the present disclosure describes improvements in the functioning of the computer itself or "any other technology or technical field" because an imaging server or user computing device is enhanced with a plurality of training images (e.g., 10,000 s of training images and related pixel data as feature data) to accurately predict, detect, or determine pixel data of an individual-specific images, such as newly provided customer images. This improves over the prior art at least because existing systems lack such predictive or classification functionality and are simply not capable of accurately analyzing individual-specific images to output a predictive result to address at least one feature identifiable within the pixel data comprising the at least one image of the individual's diaper change region.

For similar reasons, the present disclosure relates to improvement to other technologies or technical fields at least because the present disclosure describes or introduces improvements to computing devices in the field of diaper use and medical care related to such diaper use, whereby the trained diaper change region skin model executing on the imaging devices or computing devices improve the field of diaper use and medical care related to such diaper use with digital and/or artificial intelligence based analysis of user or individual images to output a predictive result to address at least one feature identifiable within the individual-specific pixel data of the individual's diaper change region.

In addition, the present disclosure includes specific features other than what is well-understood, routine, conventional activity in the field, or adding unconventional steps that confine the claim to a particular useful application, e.g., analyzing pixel data of an image of an individual's diaper change region for determining a diaper change region skin characteristic, as described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 2A illustrates an example image and its related pixel data that may be used for training and/or implementing a diaper change region skin model, in accordance with various embodiments disclosed herein.

FIG. 2B illustrates a further example image and its related pixel data that may be used for training and/or implementing a diaper change region skin model, in accordance with various embodiments disclosed herein.

FIG. 2C illustrates a further example image and its related pixel data that may be used for training and/or implementing a diaper change region skin model, in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

Figure 1:
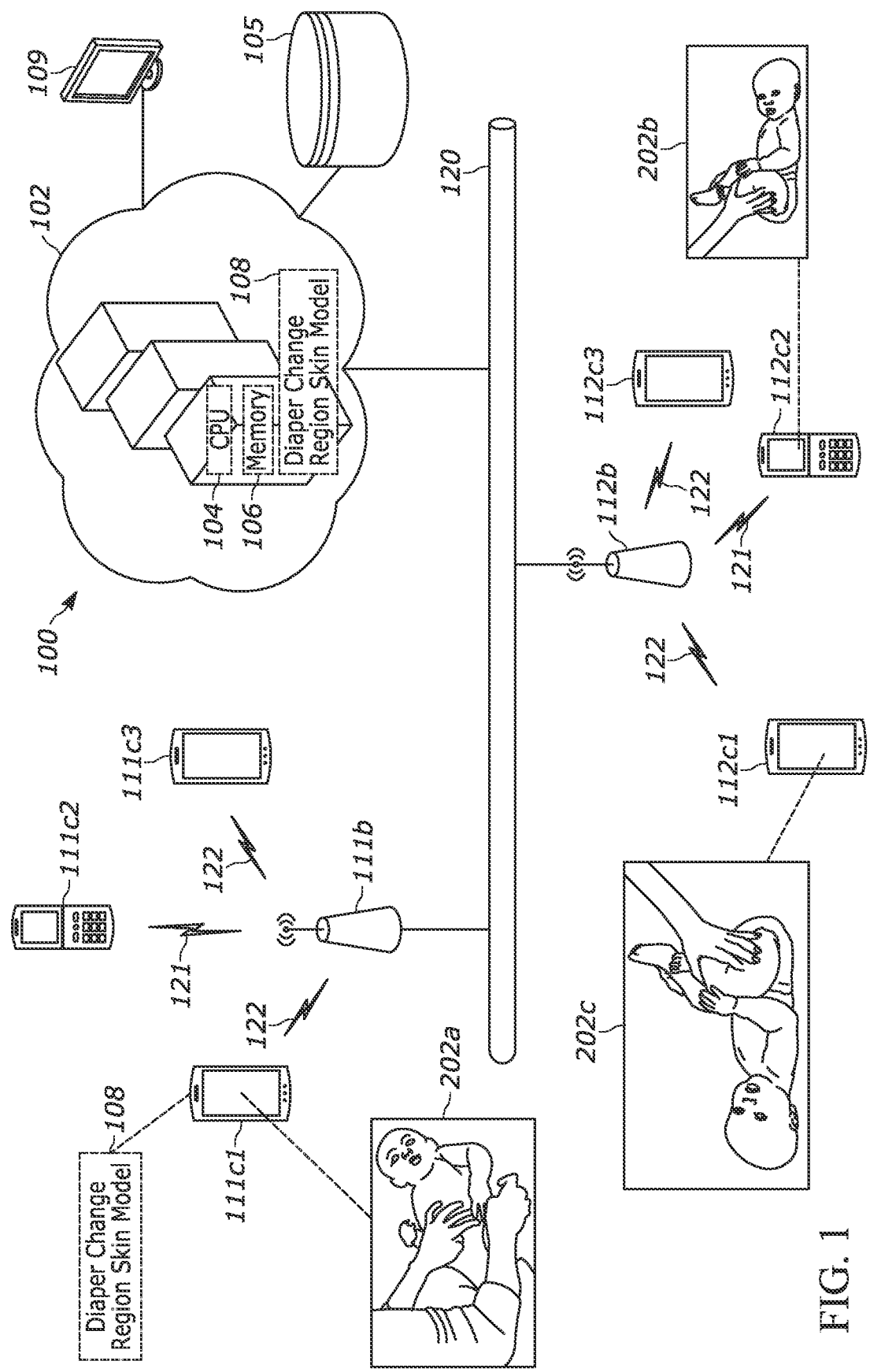
FIG. 1 illustrates an example digital imaging system configured to analyze pixel data of an image of an individual's diaper change region for determining a diaper change region skin characteristic, in accordance with various embodiments disclosed herein.

FIG. 1 illustrates an example digital imaging system 100 configured to analyze pixel data of an image (e.g., any one or more of images 202a, 202b, and/or 202c) of an individual's diaper change region for determining a diaper change region skin characteristic, in accordance with various embodiments disclosed herein. As referred to herein, a "diaper change region" may refer to any portion of the human body including the perianal region, the buttocks, the genitals, the hips, the thighs, or the individual's waist, while the individual is wearing a diaper or while the individual is not wearing a diaper, or while the individual is in the midst of a diaper change. In other words, "diaper change region" may include any area of an individual that is covered by a diaper when a diaper is worn, and any area that may be impacted by a diaper or components of a diaper or biological substances contained therein. In the example embodiment of FIG. 1, digital imaging system 100 includes server(s) 102, which may comprise one or more computer servers. In various embodiments server(s) 102 comprise multiple servers, which may comprise a multiple, redundant, or replicated servers as part of a server farm. In still further embodiments, server(s) 102 may be implemented as cloud-based servers, such as a cloud-based computing platform. For example, server(s) 102 may be any one or more cloud-based platform(s) such as MICROSOFT AZURE, AMAZON AWS, or the like. Server(s) 102 may include one or more processor(s) 104 as well as one or more computer memories 106. Server(s) 102 may be referred to herein as "imaging server(s)."

The memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory(ies) 106 may store an operating system (OS) (e.g., Microsoft Windows, Linux, Unix, etc.) capable of facilitating the functionalities, apps, methods, or other software as discussed herein. For example, an app may comprise an imaging app, which may be referred to herein as a skin analyzer imaging app. The skin analyzer imaging app may comprise computing instructions configured for implementation on an operating system of an underlying computing device, such as a user computing device and/or server. In various aspects, the skin analyzer imaging app may comprise, or may otherwise be configured to access, a diaper change region skin model 108. Like the diaper change region skin model 108, the skin analyzer imaging app may be stored on the memories of server(s) 102 and/or one or more user computing device(s). The memory(ies) 106 may also store a diaper change region skin model 108 and/or skin analyzer imaging app, which may be an artificial intelligence based model, such as a machine learning model trained on various images (e.g., images 202a, 202b, and/or 202c), as described herein. Additionally, or alternatively, the diaper change region skin model 108 may also be stored in database 105, which is accessible or otherwise communicatively coupled to imaging server(s) 102. The memories 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an imaging based machine learning model or component, such as the diaper change region skin model 108, where each may be configured to facilitate their various functionalities discussed herein. It should be appreciated that one or more other applications may be envisioned and that are executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements, or limitations, as illustrated, depicted, or described for the various flowcharts, illustrations, diagrams, figures, and/or other disclosure herein.

The processor(s) 104 may interface with the memory 106 via the computer bus to execute the operating system (OS). The processor(s) 104 may also interface with the memory 106 via the computer bus to create, read, update, delete, or otherwise access or interact with the data stored in the memories 106 and/or the database 104 (e.g., a relational database, such as Oracle, DB2, MySQL, or a NoSQL based database, such as MongoDB). The data stored in the memories 106 and/or the database 105 may include all or part of any of the data or information described herein, including, for example, training images and/or user images (e.g., either of which including any one or more of images 202a, 202b, and/or 202c) or other information of the individual, including demographic, age, race, skin type, or the like.

The imaging server(s) 102 may further include a communication component configured to communicate (e.g., send and receive) data via one or more external/network port(s) to one or more networks or local terminals, such as computer network 120 and/or terminal 109 (for rendering or visualizing) described herein. In some embodiments, imaging server(s) 102 may include a client-server platform technology such as ASP.NET, Java J2EE, Ruby on Rails, Node.js, a web service or online API, responsive for receiving and responding to electronic requests. The imaging server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements, or limitations, as illustrated, depicted, or described for the various flowcharts, illustrations, diagrams, figures, and/or other disclosure herein. According to some embodiments, the imaging server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some embodiments, computer network 120 may comprise a private network or local area network (LAN). Additionally, or alternatively, computer network 120 may comprise a public network such as the Internet.

Imaging server(s) 102 may further include or implement an operator interface configured to present information to an administrator or operator and/or receive inputs from the administrator or operator. As shown in FIG. 1, an operator interface may provide a display screen (e.g., via terminal 109). Imaging server(s) 102 may also provide I/O components (e.g., ports, capacitive or resistive touch sensitive input panels, keys, buttons, lights, LEDs), which may be directly accessible via or attached to imaging server(s) 102 or may be indirectly accessible via or attached to terminal 109. According to some embodiments, an administrator or operator may access the server 102 via terminal 109 to review information, make changes, input training data or images, and/or perform other functions.

As described above herein, in some embodiments, imaging server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, imaging server(s) 102 are communicatively connected, via computer network 120 to the one or more user computing devices 111c1-111c3 and/or 112c1-112c3 via base stations 111b and 112b. In some embodiments, base stations 111b and 112b may comprise cellular base stations, such as cell towers, communicating to the one or more user computing devices 111c1-111c3 and 112c1-112c3 via wireless communications 121 based on any one or more of various mobile phone standards, including NMT, GSM, CDMA, UMMTS, LTE, 5G, or the like. Additionally, or alternatively, base stations 111b and 112b may comprise routers, wireless switches, or other such wireless connection points communicating to the one or more user computing devices 111c1-111c3 and 112c1-112c3 via wireless communications 122 based on any one or more of various wireless standards, including by non-limiting example, IEEE 802.11a/b/c/g (WIFI), the BLUETOOTH standard, or the like.

Any of the one or more user computing devices 111c1-111c3 and/or 112c1-112c3 may comprise mobile devices and/or client devices for accessing and/or communications with imaging server(s) 102. In various embodiments, user computing devices 111c1-111c3 and/or 112c1-112c3 may comprise a cellular phone, a mobile phone, a tablet device, a personal data assistant (PDA), or the like, including, by non-limiting example, an APPLE iPhone or iPad device or a GOOGLE ANDROID based mobile phone or tablet. Moreover, in various embodiments, user computing devices 111c1-111c3 and/or 112c1-112c3 may comprise a home or personal assistant, including, for example GOOGLE HOME, AMAZON ALEXA, an ECHO SHOW device, or the like.

In additional embodiments, user computing devices 111c1-111c3 and/or 112c1-112c3 may comprise a retail computing device. A retail computing device would be configured in the same or similar manner, e.g., as described herein for user computing devices 111c1-111c3, including having a processor and memory, for implementing, or communicating with (e.g., via server(s) 102), a diaper change region skin model 108 as described herein. However, a retail computing device may be located, installed, or otherwise positioned within a retail environment to allow users and/or customers of the retail environment to utilize the digital imaging systems and methods on site within the retail environment. For example, the retail computing device may be installed within a kiosk for access by a user. The user may then upload or transfer images (e.g., from a user mobile device) to the kiosk to implement the digital imaging systems and methods described herein. Additionally, or alternatively, the kiosk may be configured with a camera to allow the user to take new images (e.g., in a private manner where warranted) of himself or herself for upload and transfer. In such embodiments, the user or consumer himself or herself would be able to use the retail computing device to receive and/or have rendered an individual-specific electronic recommendation, as described herein, on a display screen of the retail computing device. Additionally, or alternatively, the retail computing device may be a mobile device (as described herein) as carried by an employee or other personnel of the retail environment for interacting with users or consumers on site. In such embodiments, a user or consumer may be able to interact with an employee or otherwise personnel of the retail environment, via the retail computing device (e.g., by transferring images from a mobile device of the user to the retail computing device or by capturing new images by a camera of the retail computing device), to receive and/or have rendered an individual-specific electronic recommendation, as described herein, on a display screen of the retail computing device.

In addition, the one or more user computing devices 111c1-111c3 and/or 112c1-112c3 may implement or execute an operating system (OS) or mobile platform such as Apple's iOS and/or Google's Android operation system. Any of the one or more user computing devices 111c1-111c3 and/or 112c1-112c3 may comprise one or more processors and/or one or more memories for storing, implementing, or executing computing instructions or code, e.g., a mobile application, as described in various embodiments herein. As shown in FIG. 1, the diaper change region skin model 108 may also be stored locally on a memory of a user computing device (e.g., user computing device 111c1).

User computing devices 111c1-111c3 and/or 112c1-112c3 may comprise a wireless transceiver to receive and transmit wireless communications 121 and/or 122 to and from base stations 111b and/or 112b. Pixel based images 202a, 202b, and/or 202c may be transmitted via computer network 120 to imaging server(s) 102 for training of model(s) and/or imaging analysis as describe herein.

In addition, the one or more user computing devices 111c1-111c3 and/or 112c1-112c3 may include a digital camera and/or digital video camera for capturing or taking digital images and/or frames (e.g., which can be any one or more of images 202a, 202b, and/or 202c). Each digital image may comprise pixel data for training or implementing model(s), such as AI or machine learning models, as described herein. For example, a digital camera and/or digital video camera of, e.g., any of user computing devices 111c1-111c3 and/or 112c1-112c3 may be configured to take, capture, or otherwise generate digital images (e.g., pixel based images 202a, 202b, and/or 202c) and, at least in some embodiments, may store such images in a memory of a respective user computing devices. In some examples, the digital camera and/or digital video camera of the one or more user computer devices 111c1-111c3 may be a front-facing camera (e.g., the "selfie camera") illuminated by a front-facing illumination assembly (e.g., the "selfie light"). Additionally, in some examples, the digital camera and/or digital video camera of the one or more user computer devices 111c1-111c3 may be a three-dimensional camera, or may otherwise be configured to capture three-dimensional images.

Still further, each of the one or more user computer devices 111c1-111c3 and/or 112c1-112c3 may include a display screen for displaying graphics, images, text, product recommendations, data, pixels, features, and/or other such visualizations or information as described herein. In various embodiments, graphics, images, text, product recommendations, data, pixels, features, and/or other such visualizations or information may be received by imaging server(s) 102 for display on the display screen of any one or more of user computer devices 111c1-111c3 and/or 112c1-112c3. Additionally, or alternatively, a user computer device may comprise, implement, have access to, render, or otherwise expose, at least in part, an interface or a guided user interface (GUI) for displaying text and/or images on its display screen.

FIGS. 2A-2C illustrate example images 202a, 202b, and 202c that may be collected or aggregated at imaging server(s) 102 and may be analyzed by, and/or used to train, a diaper change region skin model (e.g., an AI model such as a machine learning imaging model as described herein). Each of these images may comprise pixel data (e.g., RGB data) representing feature data and corresponding to each of the personal attributes of the respective individuals 202au, 202bu, and 202cu, within the respective image. The pixel data may be captured by a digital camera of one of the user computing devices (e.g., one or more user computer devices 111c1-111c3 and/or 112c1-112c3).

Generally, as described herein, pixel data (e.g., pixel data 202ap, 202bp, and/or 202cp) comprises individual points or squares of data within an image, where each point or square represents a single pixel (e.g., pixel 202ap1 and pixel 202ap2) within an image. Each pixel may be a specific location within an image. In addition, each pixel may have a specific dimension, as well as a specific color (or lack thereof). Pixel data may be obtained in color or black-and-white formats. Pixel color may be determined by a color format and related channel data associated with a given pixel. For example, a popular color format includes the red-green-blue (RGB) format having red, green, and blue channels. That is, in the RGB format, data of a pixel is represented by three numerical RGB components (Red, Green, Blue), that may be referred to as channel data, to manipulate the color of pixel's area within the image. In some implementations, the three RGB components may be represented as three 8-bit numbers for each pixel. Three 8-bit bytes (one byte for each of RGB) is used to generate 24 bit color. Each 8-bit RGB component can have 256 possible values, ranging from 0 to 255 (i.e., in the base 2 binary system, an 8 bit byte can contain one of 256 numeric values ranging from 0 to 255). This channel data (R, G, and B) can be assigned a value from 0 and 255 and be used to set the pixel's color. For example, three values like (250, 165, 0), meaning (Red=250, Green=165, Blue=0), can denote one orange pixel. As a further example, (Red=255, Green=255, Blue=0) means red and green, each fully saturated (255 is as bright as 8 bits can be), with no blue (zero), with the resulting color being yellow. As a still further example, the color black has an RGB value of (Red=0, Green=0, Blue=0) and white has an RGB value of (Red=255, Green=255, Blue=255). gray has the property of having equal or similar RGB values. So (Red=220, Green=220, Blue=220) is a light gray (near white), and (Red=40, Green=40, Blue=40) is a dark gray (near black).

In this way, the composite of three RGB values creates the final color for a given pixel. With a 24-bit RGB color image using 3 bytes there can be 256 shades of red, and 256 shades of green, and 256 shades of blue. This provides 256×256× 256, i.e., 16.7 million possible combinations or colors for 24 bit RGB color images. In this way, the pixel's RGB data value shows how much of each of red, and green, and blue comprise the pixel. The three colors and intensity levels are combined at that image pixel, i.e., at that pixel location on a display screen, to illuminate a display screen at that location with that color. In is to be understood, however, that other bit sizes, having fewer or more bits, e.g., 10-bits, may be used to result in fewer or more overall colors and ranges.

As a whole, the various pixels, positioned together in a grid pattern, form a digital image (e.g., pixel data 202ap, 202bp, and/or 202cp). A single digital image can comprise thousands or millions of pixels. Images can be captured, generated, stored, and/or transmitted in a number of formats, such as JPEG, TIFF, PNG and GIF. These formats use pixels to store represent the image.

FIG. 2A illustrates an example image 202a and its related pixel data (e.g., pixel data 202ap) that may be used for training and/or implementing a diaper change region skin model (e.g., diaper change region skin model 108), in accordance with various embodiments disclosed herein. Example image 202a illustrates an individual 202au. Image 202a is comprised of pixel data, including pixel data 202ap. Pixel data 202ap includes a plurality of pixels including pixel 202ap1 and pixel 202ap2. Pixel 202ap1 is a red toned pixel positioned in image 202*a* comprising an area of the diaper change region of the individual where the individual 202*au* is experiencing a skin condition. Pixel 202*ap*2 is a pixel positioned in image 202*a* comprising an area of the diaper change region of the individual 202*au* without any skin conditions. Pixel data 202*ap* includes various remaining pixels including portions of the diaper change region of the individual 202*au* with or without skin conditions, and other features as shown in FIG. 2A.

FIG. 2B illustrates an example image 202*b* and its related pixel data (e.g., pixel data 202*bp*) that may be used for training and/or implementing a diaper change region skin model (e.g., diaper change region skin model 108), in accordance with various embodiments disclosed herein. Example image 202*b* illustrates an individual 202*bu*. Image 202*b* is comprised of pixel data, including pixel data 202*bp*. Pixel data 202*bp* includes a plurality of pixels including pixel 202*bp*1 and pixel 202*bp*2. Pixel 202*bp*1 is a red toned pixel positioned in image 202*b* comprising an area of the diaper change region of the individual where the individual 202*bu* is experiencing a skin condition. Pixel 202*bp*2 is a pixel positioned in image 202*b* comprising an area of the diaper change region of the individual 202*bu* without any skin conditions. Pixel data 202*bp* includes various remaining pixels including portions of the diaper change region of the individual 202*bu* with or without skin conditions, and other features as shown in FIG. 2B.

FIG. 2C illustrates an example image 202*c* and its related pixel data (e.g., pixel data 202*cp*) that may be used for training and/or implementing a diaper change region skin model (e.g., diaper change region skin model 108), in accordance with various embodiments disclosed herein. Example image 202*c* illustrates an individual 202*cu*. Image 202*c* is comprised of pixel data, including pixel data 202*cp*. Pixel data 202*cp* includes a plurality of pixels including pixel 202*cp*1 and pixel 202*cp*2. Pixel 202*cp*1 is a red toned pixel positioned in the image 202*c* in an area of the diaper change region of the individual where the individual 202*cu* is experiencing a skin condition. Pixel 202*cp*2 is a pixel positioned in image 202*c* comprising an area of the diaper change region of the individual 202*cu* without skin conditions. Pixel data 202*cp* includes various remaining pixels including portions of the diaper change region of the individual 202*cu* with or without skin conditions, and other features as shown in FIG. 2C.

Figure 3:
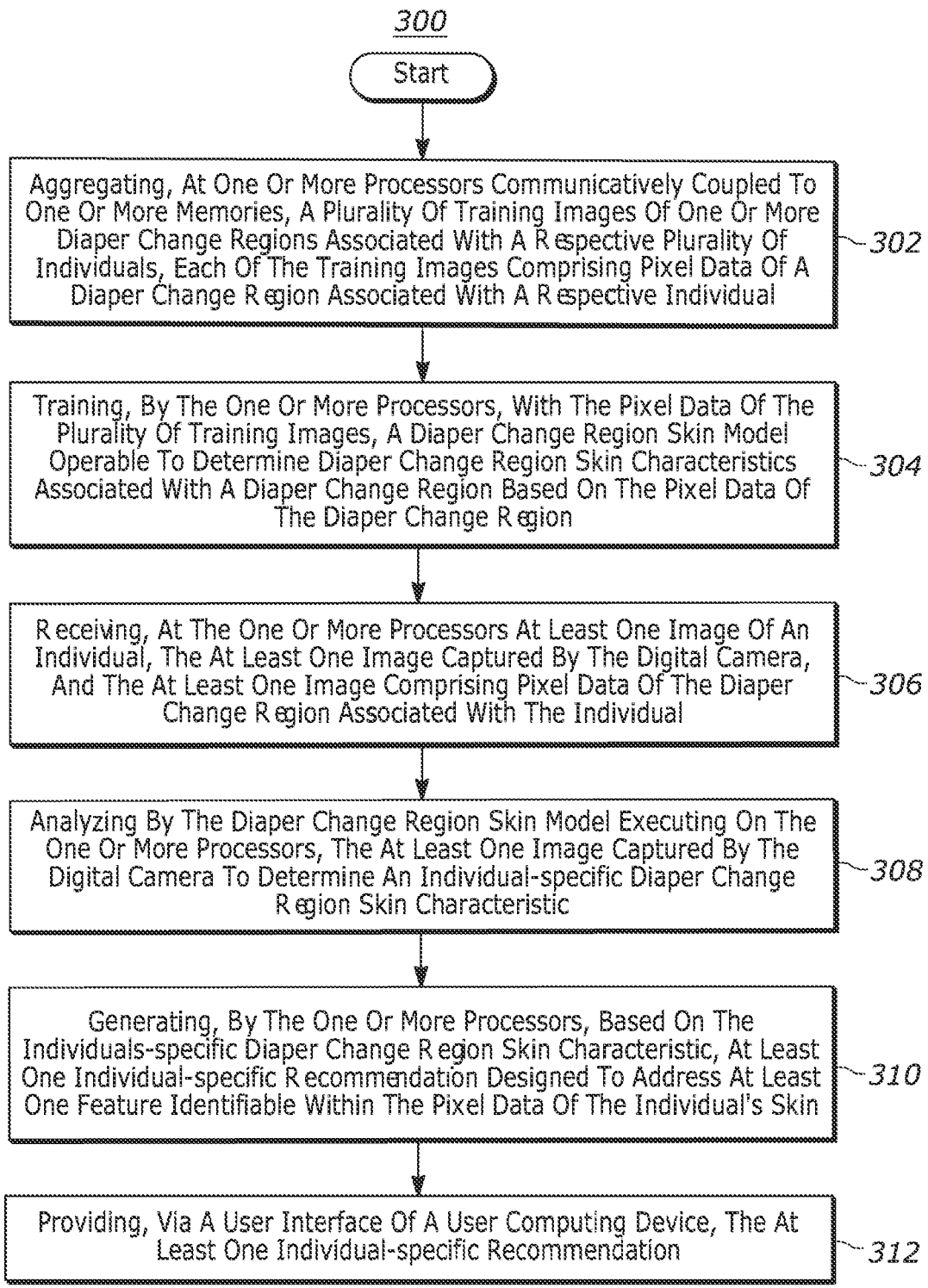
FIG. 3 illustrates a diagram of a digital imaging method of analyzing pixel data of an image of an individual's diaper change region for determining a diaper change region skin characteristic, in accordance with various embodiments disclosed herein.

FIG. 3 illustrates a diagram of a digital imaging method 300 of analyzing pixel data of an image (e.g., images 202*a*, 202*b*, and/or 202*c*) of an individual's diaper change region for determining a diaper change region skin characteristic, in accordance with various embodiments disclosed herein. Method 300 may comprise an algorithm implementing computing instruction to perform the blocks as shown and described for method 300. In various aspects, for example, method 300 may be implemented or otherwise executed by a skin analyzer imaging app comprising computing instructions configured for implementation on an operating system of an underlying computing device. In various aspects, the skin analyzer imaging app may comprise, or may otherwise be configured to access, a diaper change region skin model 108. Like the diaper change region skin model 108, the skin analyzer imaging app may be stored on the memories of server(s) 102 and/or one or more user computing device(s). Images, as described herein, are generally pixel images as captured by a digital camera (e.g., a digital camera of user computing device 111*c*1). In some embodiments an image may comprise or refer to a plurality of images such as a plurality of images (e.g., frames) as collected using a digital video camera. Frames comprise consecutive images defining motion, and can comprise a movie, a video, or the like.

At block 302, the method 300 comprises aggregating, at one or more processors (e.g., imaging server(s) 102 and/or a user computing device, such as user computing device 111*c*1) communicatively coupled to one or more memories, a plurality of training images of one or more diaper change regions associated with a respective plurality of individuals, each of the training images comprising pixel data of a diaper change region associated with a respective individual. In some examples, the training images include indications of pixel data of the plurality of training images corresponding to areas or items that are not part of the individual's diaper change region, such as one or more of: a diaper change pad, a diaper changing area, and/or surrounding elements of the diaper changing area, or portions of a caregiver's body, such as a caregiver's hands or arms. For instance, these areas or items that are not part of the individual's diaper change region may be labeled or otherwise identified as such, and in some examples, may be segmented out of (or otherwise removed from) the plurality of training images before proceeding to block 304. In some examples, each of the training images may be captured within a threshold timeframe of each respective individual's diaper change (e.g., within minutes of a diaper change, within 30 minutes of a diaper change, within one hour of a diaper change, etc.). For instance, in some examples, the one or more processors include at least one of a server or a cloud-based computing platform, and the server or the cloud-based computing platform receives the plurality of training images of the plurality of individuals via a computer network.

At block 304, the method 300 comprises training, by the one or more processors (e.g., processor(s) 102), with the pixel data of the plurality of training images, a diaper change region skin model (e.g., diaper change region skin model 108) operable to determine diaper change region skin characteristics associated with a diaper change region based on the pixel data of the diaper change region. In various embodiments, the diaper change region skin model is an artificial intelligence (AI) based model trained with at least one AI algorithm.

In some examples, the diaper change skin characteristic may be a scaled value. The scale can be an internalized scale or otherwise custom scale, unique to the diaper change region skin model, where a least or small scaled value may be determined from an image or set of images having skin areas where the pixel data indicates lower numbers of skin conditions, and/or a lower severity level of any skin conditions. Similarly, a most or large scaled value may be determined from an image or set of images having diaper change region areas or portions where the pixel data indicates that the individual's skin has a higher number of skin conditions, and/or a higher severity level of any skin conditions.

In some embodiments, the diaper change skin characteristic may be a percentage scale value, e.g., outputting percentage scale values from 0% to 100%, where 0% represents least skin conditions or least severe skin conditions and 100% represents most skin conditions or most severe skin conditions. Values can range across this scale where a percentage scale value of 67% represents one or more pixels of a skin area detected within an image that has a higher number of skin conditions and/or more severe skin conditions than a percentage scale value of 10% as detected for one or more pixels of a skin within the same image or a different image (of the same or different individual).

In some embodiments, the diaper change skin characteristic may be a numerical or decimal based scale, e.g., outputting values, e.g., from 0 to 10, where 0 represents least skin conditions and/or least severe skin conditions and 10 represents most skin conditions and/or most severe skin conditions. Values can range across this scale where a value of 7 represents one or more pixels of a skin area detected within an image that has a higher number of skin conditions and/or more severe skin conditions than a value of 2 as detected for one or more pixels of a skin within the same image or a different image (of the same or different individual). Different areas within the diaper change region may have or be associated with different characteristics and may be valued using different scales—for example, a first diaper change region may have a lower score, and a second diaper change area may have a higher score.

Diaper change region skin characteristics may be determined at the pixel level or for a given diaper change region area or portion (e.g., one or more pixels) in an image. Diaper change region skin characteristics may be calculated and/or reported as percent skin condition per body area location (anatomical area). For example, a waist total area may be 10,000 pixels, and a rash area may be 4,000 pixels within the 10,000 pixels of the waist area. Thus the skin condition coverage area is 40% of the waist body area location.

In some embodiments, a comprehensive diaper change region skin characteristic, which can be an individual-specific diaper change region skin characteristic as described herein, may be determined by averaging (or otherwise statistically analyzing) diaper change region skin characteristics for one or more pixels of a given diaper change region area or portion.

In some examples, the server or the cloud-based computing platform discussed above with respect to block 302 trains the diaper change region skin model with the pixel data of the plurality of training images.

Training of the diaper change region skin model 108 involves image analysis of the training images to configure weights of diaper change region skin model, and its underlying algorithm (e.g., machine learning or artificial intelligence algorithm) used to predict and/or classify future images. For example, in various embodiments herein, generation of diaper change region skin model 108 involves training diaper change region skin model 108 with a plurality of training images of a plurality of individuals, where each of the training images comprise pixel data of the individual's diaper change region. In some embodiments, the pixel data of the diaper change regions associated with the respective plurality of individuals may include pixel data of the diaper change regions associated with the respective plurality of individuals from a plurality of perspectives and/or angles. Moreover, in some embodiments, personally identifying information associated with the plurality of individuals may be removed from, or otherwise not depicted within, the pixel data of the diaper change regions associated with the respective plurality of individuals that is used for training the diaper change region skin model 108.

In some embodiments, one or more processors of a server or a cloud-based computing platform (e.g., imaging server(s) 102) may receive the plurality of training images of the plurality of individuals via a computer network (e.g., computer network 120). In such embodiments, the server and/or the cloud-based computing platform may train the diaper change region skin model 108 with the pixel data of the plurality of training images.

For example, in various embodiments, a machine learning imaging model as described herein (e.g., diaper change region skin model 108), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular area of interest. The machine learning programs or algorithms may also include deep learning neural network, natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, the artificial intelligence and/or machine learning based algorithms may be included as a library or package executed on server(s) 102. For example, libraries may include the TENSORFLOW based library, the PYTORCH library, and/or the SCIKIT-LEARN Python library.

Machine learning may involve identifying and recognizing patterns in existing data (such as training a model based on pixel data within images having pixel data of respective individuals' bodies) in order to facilitate making predictions or identification for subsequent data (such as using the model on new pixel data of a new individual's diaper change region in order to determine an individual-specific diaper change region skin characteristic).

Machine learning model(s), such as the diaper change region skin model described herein for some embodiments, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

Image analysis may include training a machine learning based model (e.g., the diaper change region skin model 108) on pixel data of images of one or more individuals' bodies (i.e., images of the diaper change regions of the individuals). Additionally, or alternatively, image analysis may include using a machine learning imaging model, as previously trained, to determine, based on the pixel data (e.g., including their RGB values) of one or more images of the diaper change region of the individual(s), an individual-specific diaper change region skin characteristic.

The weights of the model may be trained, for instance, based on the dimension and/or color of each of the individual pixels of a given image. For instance, training based on dimension may include an analysis of a dimension associated with each of the individual pixels of a given image. In some examples, a particular dimensionality of one or more pixels of a given image, or a different dimensionality of one or more pixels of the given image compared to other pixels in the same image corresponding to the same body part may indicate that portions of the individual's diaper change region in the image are raised (indicating, for example swelling or the presence of inflammation, a pimple, a pustule, a papule, and the like) or indented (indicating, for example skin indents and/or pressure marks), which may indicate that certain skin conditions or concerns are present and/or quantify the number of such skin conditions in the portion of the individual's diaper change region. Training based on color may include an analysis of various RGB values of individual pixels of a given image. For example, red toned RGB values (e.g., a pixel with values R=215, G=90, B=85) may indicate areas of the individual's diaper change region having various skin conditions, as well as the number or severity of any skin conditions of the individual's diaper change region. Lighter RGB values (e.g., a pixel with R=181, G=170, and B=191) may indicate a lighter value, such as a skin tone color, i.e., indicating areas of the individual's diaper change region without skin conditions, or with fewer or less severe skin conditions. The weights of the model may be trained based on different skin tone colors and different skin types, such as the Fitzpatrick skin types, in some embodiments.

When a large number of pixels having a particular dimensionality, and/or a large number of pixels having red toned RGB values, are positioned within a given image of an area of the individual's diaper change region, this may indicate that the individual is experiencing a large number of skin conditions or very severe skin conditions in the area of the individual's diaper change region shown in the image. In this way, pixel data (e.g., detailing one or more features of an individual, such as the individual's diaper change region) of 10,000 s of training images may be used to train or use a machine learning imaging model to determine an individual-specific diaper change region skin characteristic.

In various embodiments, a diaper change region skin model (e.g., diaper change region skin model 108) may be further trained, by one or more processors (e.g., imaging server(s) 102 and/or a user computing device, such as user computing device 111c1), with the pixel data of the plurality of training images, to output one or more location identifiers indicating one or more corresponding body area locations of respective individuals. In such embodiments, the diaper change region skin model (e.g., diaper change region skin model 108), executing on the one or more processors (e.g., imaging server(s) 102 and/or a user computing device, such as user computing device 111c1) and analyzing the at least one image of the individual, can determine a location identifier indicating a body area location of the individual's skin. For example, body area locations, within the diaper change region, may comprise the individual's perianal region, the individual's buttocks, the individual's genitals, the individual's hips, the individual's thighs, and/or the individual's waist.

With reference to FIG. 3, at block 306, the method 300 comprises receiving, at the one or more processors (e.g., imaging server(s) 102 and/or a user computing device, such as user computing device 111c1), at least one image of an individual, the at least one image captured by a digital camera, and the at least one image comprising pixel data of the diaper change region associated with the individual. In some examples, each of the training images may be captured within a threshold timeframe of each respective individual's diaper change (e.g., within minutes of removal diaper change, within 30 minutes of a diaper change, within one hour of a diaper change, etc.). In some examples, the digital camera is a digital video camera, and the at least one image is a plurality of images. In some examples, the server or a cloud-based computing platform discussed above with respect to block 302 receives the at least one image. Moreover, in some examples, a user computing device (e.g., a mobile device, a tablet, a handheld device, a desktop device, a personal assistant device, a home assistant device, smart/VR glasses, etc.) receives the at least one image.

At block 308, the method 300 comprises analyzing by the diaper change region skin model (e.g., diaper change region skin model 108) executing on the one or more processors (e.g., imaging server(s) 102 and/or a user computing device, such as user computing device 111c1), the at least one image captured by the digital camera to determine an individual-specific diaper change region skin characteristic (e.g., based on a number or severity level of skin conditions). In some examples, the server or a cloud-based computing platform discussed above with respect to block 302 analyzes the at least one image to determine the individual-specific diaper change region skin characteristic. Furthermore, in some examples, the user computing device discussed above with respect to block 306 analyzes the at least one image to determine the individual-specific diaper change region skin characteristic. Additionally, in some examples, the diaper change region skin model 108 may further analyze the at least one image captured by the digital camera to determine a location identifier indicating a location within the diaper change region, such as a specific area or portion of the individual's skin (e.g., one of the individual's perianal region, the individual's buttocks, the individual's genitals, the individual's hips, the individual's thighs, or the individual's waist, or a portion of one of these areas, etc.).

At block 310, the method 300 comprises generating, by the one or more processors (e.g., imaging server(s) 102 and/or a user computing device, such as user computing device 111c1), based on the individual-specific diaper change region skin characteristic, at least one individual-specific recommendation designed to address at least one feature identifiable within the pixel data of the individual's skin. Moreover, in some examples, the server or a cloud-based computing platform discussed above with respect to block 302 generates the at least one individual-specific recommendation and transmits the individual-specific recommendation to the user computing device for rendering on the display screen of the user computing device. Furthermore, in some examples, the user computing device discussed above with respect to block 306 generates the at least one individual-specific recommendation.

For instance, the individual-specific recommendation may include at least one product recommendation for a manufactured product designed to address at least one feature identifiable within the pixel data of the individual's skin. As another example, the individual-specific recommendation may include a recommended behavior, e.g., selected from two or more available behaviors based on the diaper change region skin characteristic. Moreover, in some examples, the individual-specific recommendation may include, e.g., a recommendation to use a mobile device application, a recommendation to practice one or more procedures associated with the diaper change region, a recommendation to seek or receive healthcare related to the diaper change region, and/or a recommendation of a lifestyle change related to the diaper change region. Additionally, in some examples, the individual-specific recommendation may include a recommendation for a visit with a healthcare provider.

At block 312, the method 300 comprises providing, via a user interface of a user computing device, the at least one individual-specific recommendation. A user computing device may comprise at least one of a mobile device, a tablet, a handheld device, a desktop device, a personal assistant device, or a home assistant device, for example, as described herein for FIG. 1. In some embodiments, the at least one individual-specific recommendation may be provided as a textual recommendation via the user interface of the user computing device. Moreover, in some embodiments, the at least one individual-specific recommendation may be provided as an audio recommendation via the user interface of the user computing device, e.g., via a speaker of the user computing device. Additionally, in instances in which the at least one individual-specific recommendation includes a recommendation for a visit with a healthcare provider, providing the individual-specific recommendation may include initiating a live chat, a phone call, a text message, AI-enabled communication/interaction, or a video chat with the healthcare provider via the user interface of the user computing device.

In some embodiments, the user computing device (e.g., user computing device 111c1) may receive the at least one image comprising the pixel data of the individual's skin. In such embodiments, the user computing device may execute the diaper change region skin model (e.g., diaper change region skin model 108) locally and generate, based on output of the diaper change region skin model (e.g., diaper change region skin model 108), the individual-specific recommendation. The user computing device 111c1 may then provide the individual-specific recommendation by rendering the individual-specific recommendation on its display screen.

Additionally, or alternatively, in other embodiments, the imaging server(s) 102 may analyze the individual image remotely from the user computing device to determine the individual-specific diaper change region skin characteristic and/or individual-specific electronic recommendation designed to address at least one feature identifiable within the pixel data comprising the individual's skin. For example, in such embodiments imaging server or a cloud-based computing platform (e.g., imaging server(s) 102) receives, across computer network 120, the at least one image comprising the pixel data of at the individual's skin. The server or a cloud-based computing platform may then execute the diaper change region skin model (e.g., diaper change region skin model 108) and generate, based on output of the diaper change region skin model (e.g., diaper change region skin model 108), the individual-specific recommendation. The server or a cloud-based computing platform may then transmit, via the computer network (e.g., computer network 120), the individual-specific recommendation to the user computing device for rendering on the display screen of the user computing device.

In some embodiments, the user may submit a new image to the diaper change region skin model for analysis as described herein. In such embodiments, one or more processors (e.g., imaging server(s) 102 and/or a user computing device, such as user computing device 111c1) may receive a new image of the individual. The new image may be captured by a digital camera of user computing device 111c1. The new image may comprise pixel data of at least a portion of the individual's skin. The diaper change region skin model (e.g., diaper change region skin model 108) may then analyze, on the one or more processors (e.g., imaging server(s) 102 and/or a user computing device, such as user computing device 111c1), the new image captured by the digital camera to determine a new individual-specific diaper change region skin characteristic. In some examples, the one or more processors (e.g., imaging server(s) 102 and/or a user computing device, such as user computing device 111c1) may generate a delta diaper change region skin characteristic based on a comparison between the new individual-specific diaper change region skin characteristic and the (initial or previous) diaper change region skin characteristic. A new individual-specific electronic recommendation or comment may be generated, based on the new individual-specific diaper change region skin characteristic or based on the delta diaper change region skin characteristic, regarding at least one feature identifiable within the pixel data of the new image. The new individual-specific recommendation or comment (e.g., message) may then be rendered on a display screen of a user computing device of the user.

In some embodiments, an individual-specific electronic recommendation may be displayed on the display screen of a user computing device (e.g., user computing device 111c1) with a graphical representation of the individual's skin as annotated with one or more graphics or textual renderings corresponding to the individual-specific diaper change region skin characteristic. In still further embodiments, the at least one individual-specific electronic recommendation may be rendered in real-time or near-real time during or after a diaper change.

In additional embodiments, an individual-specific electronic recommendation may comprise a product recommendation for a manufactured product. In such embodiments, the individual-specific electronic recommendation may be displayed on the display screen of a user computing device (e.g., user computing device 111c1) with instructions (e.g., a message) for treating, with the manufactured product, the at least one feature identifiable the pixel data comprising the at least the portion of the individual's skin. In still further embodiments, either the user computing device 111c1 and/or imaging server(s) may initiate, based on the product recommendation, the manufactured product for shipment to the user.

Moreover, in some embodiments, a modified image how the individual's skin is predicted to appear after treating the at least one feature with the manufactured product may be generated and rendered on the display screen of the user computing device 111c1, e.g., alongside the electronic recommendation for the manufactured product. Additionally, in some embodiments, a modified image depicting instructions for how to treat the at least one feature using the manufactured products may be generated and rendered on the display screen of the user computing device 111c1, e.g., alongside the electronic recommendation for the manufactured product. Furthermore, in some embodiments, a modified image depicting instructions for how to treat the at least one feature by applying the diaper to the individual's diaper change region in a particular manner may be generated and rendered on the display screen of the user computing device 111c1, e.g., alongside the electronic recommendation for the manufactured product. For instance, the modified image(s) may be rendered in an augmented reality (AR) format.

Figure 4:
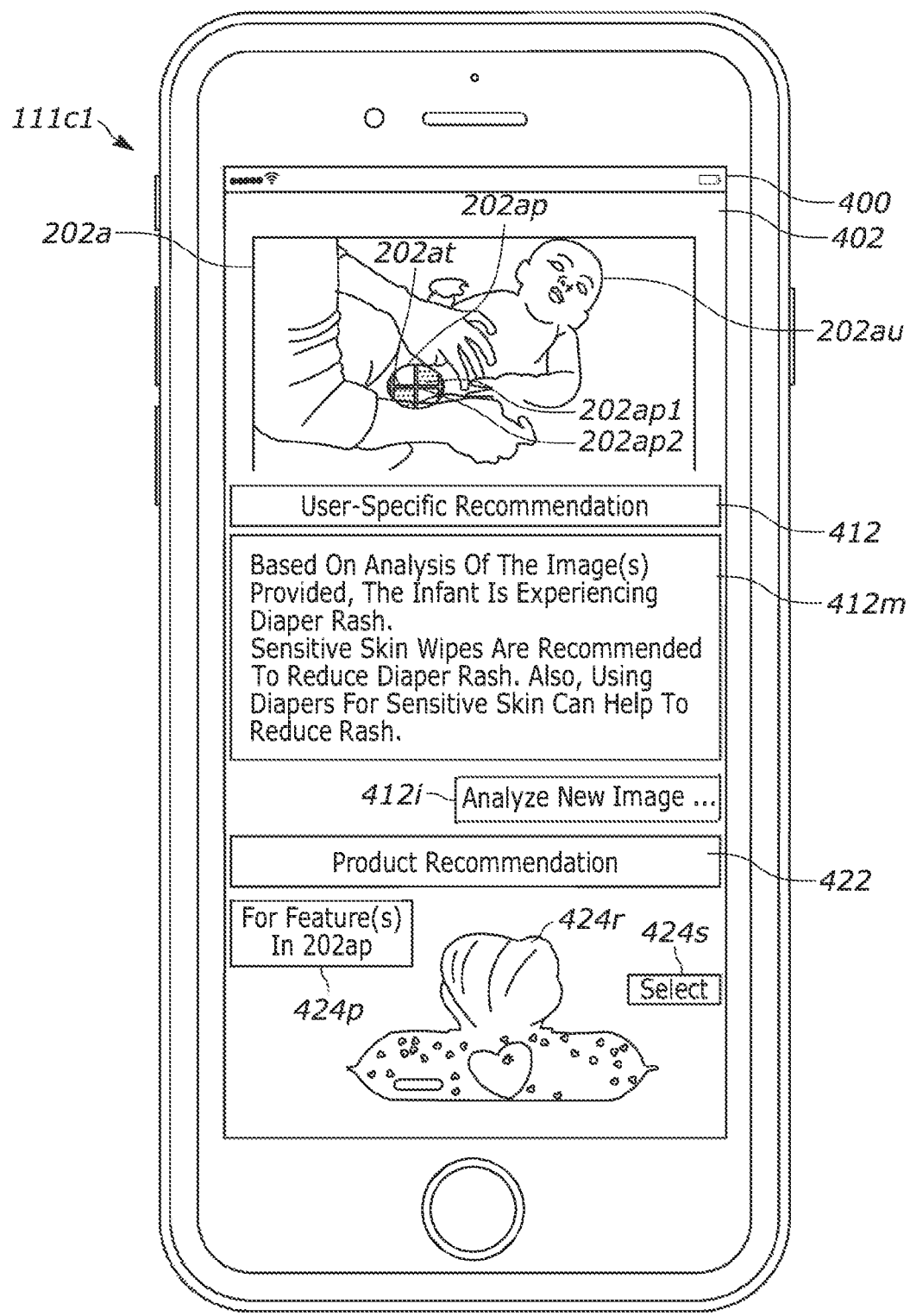
FIG. 4 illustrates an example user interface as rendered on a display screen of a user computing device in accordance with various embodiments disclosed herein.

FIG. 4 illustrates an example user interface 402 as rendered on a display screen 400 of a user computing device 111c1 in accordance with various embodiments disclosed herein. For example, as shown in the example of FIG. 4, user interface 402 may be implemented or rendered via an application (app) executing on user computing device 111c1.

For example, as shown in the example of FIG. 4, user interface 402 may be implemented or rendered via a native app executing on user computing device 111c1. In the example of FIG. 4, user computing device 111c1 is a user computer device as described for FIG. 1, e.g., where 111c1 is illustrated as an APPLE iPhone that implements the APPLE iOS operating system and has display screen 400. User computing device 111c1 may execute one or more native applications (apps) on its operating system. Such native apps may be implemented or coded (e.g., as computing instructions) in a computing language (e.g., SWIFT) executable by the user computing device operating system (e.g., APPLE iOS) by the processor of user computing device 111c1.

Additionally, or alternatively, user interface 402 may be implemented or rendered via a web interface, such as via a web browser application, e.g., Safari and/or Google Chrome app(s), or other such web browser or the like.

As shown in the example of FIG. 4, user interface 402 comprises a graphical representation (e.g., image 202a) of the individual's skin. Image 202a may be the at least one image of the individual's skin (or graphical representation thereof) and as analyzed by the diaper change region skin model (e.g., diaper change region skin model 108) as described herein. In the example of FIG. 4, graphical representation (e.g., image 202a) of the individual's skin is annotated with one or more graphics (e.g., area of pixel data 202ap) or textual renderings corresponding to the number or severity of skin conditions experienced by the individual. For example, the area of pixel data 202ap may be annotated or overlaid on top of the image of the individual (e.g., image 202a) to highlight the area or feature(s) identified within the pixel data (e.g., feature data and/or raw pixel data) by the diaper change region skin model (e.g., diaper change region skin model 108). In the example of FIG. 4, the area of pixel data 202ap and the feature(s) identified within the pixel data 202ap include the number of skin conditions, the severity level of any skin conditions, and other features shown in area of pixel data 202ap. In various embodiments, the pixels identified as the specific features indicating skin conditions (e.g., pixel 202ap1 as a red toned pixel indicating a skin condition) may be highlighted or otherwise annotated when rendered.

In some examples, a textual rendering may show an individual-specific diaper change region skin characteristic (e.g., a diaper change region value of 8/10) which illustrates that the individual's number and/or severity of skin conditions is above average for typical individuals (e.g., with 10 corresponding to a maximum number of and/or severity of skin conditions, 1 corresponding to a minimum number of and/or severity of skin conditions, and 5 corresponding to an average number of and/or severity of skin conditions). In particular, 8/10 value indicates a higher rate of skin conditions and/or more severe skin conditions, compared to other individuals. It is to be understood that other textual rendering types or values are contemplated herein, where textual rendering types or values may be rendered, for example, as a range of 1 to 100, as a letter grade, or some other indication of a diaper change region skin characteristic. Additionally, or alternatively, color values may use and/or overlaid on a graphical representation shown on user interface 402 (e.g., image 202a) to indicate skin conditions.

In some examples, in addition to, or as an alternative to providing a single severity score, the user interface may provide values for different intensities found within a skin condition area—for example 15% of the skin condition area may be scored 3/10 (less severe), 2.4% of the skin condition area may be scored 5/10 (moderate severity), and 1.6% of the skin condition area may be scored 9/10 (intense severity). Such a breakdown in severity score may help a user or caregiver to determine the actual severity of a skin condition, as well as track progression of a skin condition and treatment thereof over time.

User interface 402 may also include or render an individual-specific electronic recommendation 412. In the embodiment of FIG. 4, individual-specific electronic recommendation 412 comprises a message 412m to the user designed to address at least one feature identifiable within the pixel data comprising a portion of the individual's skin. As shown in the example of FIG. 4, message 412m recommends to the user to switch to a different type of diapers and wipes to reduce the diaper rash of the individual. The product recommendation can be correlated to the identified feature within the pixel data, and the user computing device 111c1 and/or server(s) 102 can be instructed to output the product recommendation when the feature (e.g., large number of skin conditions, very severe skin conditions, etc.) is identified. In one example, pixel data may correspond to identify feature(s) that correlate to skin indents, and the user computing device and/or server may be instructed to output a product recommendation for a larger size diaper or article. The electronic recommendation may be a recommendation for a product, a habit or practice, such as introduction or exclusion of certain types of foods or maintenance of a specific died practice, professional counseling and/or community support.

User interface 402 also include or render a section for a product recommendation 422 for a manufactured product 424r (e.g., diapers, wipes, creams or lotions, baby powder, etc.). The product recommendation 422 generally corresponds to the individual-specific electronic recommendation 412, as described above. For example, in the example of FIG. 4, the individual-specific electronic recommendation 412 is displayed on display screen 400 of user computing device 111c1 with instructions (e.g., message 412m) for treating, with the manufactured product (manufactured product 424r (e.g., the particular diaper, the particular wipes, the particular lotion or cream, the particular baby powder, etc.) at least one feature (e.g., the number of skin conditions, the severity level of any skin conditions, etc., as shown at pixel 202ap1) identifiable from the pixel data (e.g., pixel data 202ap) comprising the skin of the individual.

As shown in FIG. 4, user interface 402 recommends a product (e.g., manufactured product 424r (e.g., the particular diaper, the particular wipes, the particular lotion or cream, the particular baby powder, etc.) based on the individual-specific electronic recommendation 412. In the example of FIG. 4, the output or analysis of image(s) (e.g., image 202a) of the diaper change region skin model 108, e.g., individual-specific electronic recommendation 412 and/or its related values (e.g., diaper change region skin characteristic value of 8/10) or related pixel data (e.g., 202ap1 and/or 202ap2) may be used to generate or identify recommendations for corresponding product(s). Such recommendations may include products such as the particular diaper, the particular wipes, the particular lotion or cream, the particular baby powder, etc., or the like to address the individual-specific issue as detected within the pixel data by the diaper change region skin model (e.g., diaper change region skin model 108).

In the example of FIG. 4, user interface 402 renders or provides a recommended product (e.g., manufactured product 424r) as determined by the diaper change region skin model (e.g., diaper change region skin model 108) and its related image analysis of image 202a and its pixel data and various features. In the example of FIG. 4, this is indicated and annotated (424p) on user interface 402.

User interface 402 may further include a selectable UI button 424s to allow a user (e.g., a caregiver or guardian of the individual of image 202a) to select for purchase or shipment the corresponding product (e.g., manufactured product 424r). In some embodiments, selection of selectable UI button 424s may cause the recommended product(s) to be shipped to the user and/or may notify a third party that the individual is interested in the product(s). For example, either user computing device 111c1 and/or imaging server(s) 102 may initiate, based on individual-specific electronic recommendation 412, the manufactured product 424r (e.g., the particular diaper, the particular wipes, the particular lotion or cream, the particular baby powder, etc.) for shipment to the user. In such embodiments, the product may be packaged and shipped to the user.

In various embodiments, graphical representation (e.g., image 202a), with graphical annotations (e.g., area of pixel data 202ap), textual annotations (e.g., text 202at), and/or individual-specific electronic recommendations 412 may be transmitted, via the computer network (e.g., from an imaging server 102 and/or one or more processors) to user computing device 111c1, for rendering on display screen 400. In other embodiments, no transmission to the imaging server of the user's specific image occurs, where the individual-specific recommendation (and/or product specific recommendation) may instead be generated locally, by the diaper change region skin model (e.g., diaper change region skin model 108) executing and/or implemented on the user's mobile device (e.g., user computing device 111c1) and rendered, by a processor of the mobile device, on display screen 400 of the mobile device (e.g., user computing device 111c1).

In some embodiments, any one or more of graphical representations (e.g., image 202a), with graphical annotations (e.g., area of pixel data 202ap), textual annotations, individual-specific electronic recommendation 412, and/or product recommendation 422 may be rendered (e.g., rendered locally on display screen 400) in real-time or near-real time, e.g., during or after a diaper change. In embodiments where the image is analyzed by imaging server(s) 102, the image may be transmitted and analyzed in real-time or near real-time by imaging server(s) 102.

In some embodiments the user may provide a new image that may be transmitted to imaging server(s) 102 for updating, retraining, or reanalyzing by diaper change region skin model 108. In other embodiments, a new image that may be locally received on computing device 111c1 and analyzed, by diaper change region skin model 108, on the computing device 111c1.

In addition, as shown in the example of FIG. 4, the user may select a selectable button 412i for reanalyzing (e.g., either locally at computing device 111c1 or remotely at imaging server(s) 102) a new image. Selectable button 412i may cause user interface 402 to prompt the user to attach a new image for analyzing. Imaging server(s) 102 and/or a user computing device such as user computing device 111c1, may receive a new image of the individual. The new image may be captured by the digital camera. The new image (e.g., just like image 202a) may comprise pixel data of the skin of the individual. The diaper change region skin model (e.g., diaper change region skin model 108), executing on the memory of the computing device (e.g., imaging server(s) 102), may analyze the new image captured by the digital camera to determine a new individual-specific diaper change region skin characteristic after the individual experiences another diaper change. The computing device (e.g., imaging server(s) 102) may generate, based on the new diaper change region skin characteristic, a new individual-specific electronic recommendation or comment regarding at least one feature identifiable within the pixel data of the new image. For example, the new individual-specific electronic recommendation may include a new graphical representation including graphics and/or text (e.g., showing a new individual-specific diaper change region skin characteristic, e.g., 4/10).

The new individual-specific electronic recommendation may include additional recommendations or additional information for the individual, e.g., that the individual has improved his or her diaper change region skin characteristic (i.e., reduced the rate or severity of skin conditions) as detected with the pixel data of the new image. In various embodiments, the new individual-specific recommendation or comment may be transmitted via the computer network to the user computing device of the user for rendering on the display screen of the user computing device. In other embodiments, no transmission to the imaging server of the user's new image occurs, where the new individual-specific recommendation (and/or product specific recommendation) may instead be generated locally, by the diaper change region skin model (e.g., diaper change region skin model 108) executing and/or implemented on the user's mobile device (e.g., user computing device 111c1) and rendered, by a processor of the mobile device, on a display screen of the mobile device (e.g., user computing device 111c1).

Aspects of the Disclosure

1. A digital imaging method of analyzing pixel data of at least one image of a diaper change region associated with an individual for determining an individual-specific diaper change region skin characteristic, the digital imaging method comprising the steps of: aggregating, at one or more processors communicatively coupled to one or more memories, a plurality of training images of one or more diaper change regions associated with a respective plurality of individuals, each of the training images comprising pixel data of a diaper change region associated with a respective individual; training, by the one or more processors, with the pixel data of the plurality of training images, a diaper change region skin model operable to determine diaper change region skin characteristics associated with a diaper change region based on the pixel data of the diaper change region; receiving, at the one or more processors at least one image of an individual, the at least one image captured by a digital camera, and the at least one image comprising pixel data of the diaper change region associated with the individual; analyzing by the diaper change region skin model executing on the one or more processors, the at least one image captured by the digital camera to determine an individual-specific diaper change region skin characteristic; generating, by the one or more processors, based on the individual-specific diaper change region skin characteristic, at least one individual-specific recommendation designed to address at least one feature identifiable within the pixel data of the individual's skin; and providing, via a user interface of a user computing device, the at least one individual-specific recommendation.

2. The digital imaging method of aspect 1, wherein the plurality of training images include images comprising pixel data of the diaper change regions associated with the respective plurality of individuals from a plurality of perspectives.

3. The digital imaging method of any one of aspects 1 or 2, wherein the plurality of training images include images comprising pixel data of the diaper change regions associated with the respective plurality of individuals without depicting personally identifying information associated with the respective plurality of individuals.

4. The digital imaging method of any one of aspects 1-3, wherein the at least one individual-specific recommendation is displayed via the user interface of the user computing device with a graphical representation of the individual's skin as annotated with one or more graphics, videos, voice, and/or textual renderings corresponding to the individual-specific diaper change region skin characteristic.

5. The digital imaging method of any one of aspects 1-4, wherein the at least one individual-specific recommendation is a textual recommendation displayed via the user interface of the user computing device.

6. The digital imaging method of any one of aspects 1-5, wherein the at least one individual-specific recommendation is an audio recommendation provided via the user interface of the user computing device.

7. The digital imaging method of any one of aspects 1-6, wherein the at least one individual-specific recommendation includes one or more of: a recommendation to use a mobile device application, a recommendation to practice one or more procedures associated with the diaper change region, a recommendation to seek or receive healthcare related to the diaper change region, or a recommendation of a lifestyle change related to the diaper change region.

8. The digital imaging method of any one of aspects 1-7, wherein the at least one individual-specific recommendation is a recommendation for a visit with a healthcare provider.

9. The digital imaging method of aspect 8, further comprising the steps of: initiating, by the one or more processors, based on the recommendation for the visit with the healthcare provider, a live chat, a text message, and/or video with the healthcare provider.

10. The digital imaging method of any one of aspects 1-9, wherein the at least one individual-specific recommendation is a recommendation for a manufactured product.

11. The digital imaging method of aspect 10, further comprising the steps of: initiating, by the one or more processors, based on the recommendation for the manufactured product, the manufactured product for shipment to an address associated with the individual.

12. The digital imaging method of any one of aspects 10 or 11, further comprising: generating, by the one or more processors, a modified image based on the at least one image, the modified image depicting how the individual's diaper change region is predicted to appear after treating the at least one feature with the manufactured product; and rendering, via the user interface of the user computing device, the modified image.

13. The digital imaging method of aspect 12, wherein rendering the modified image includes rendering the modified image in an augmented reality (AR) format.

14. The digital imaging method of aspect 7, wherein the at least one individual-specific recommendation is displayed via the user interface of the user computing device with instructions for treating, with the manufactured product, the at least one feature identifiable within the pixel data of the individual's skin.

15. The digital imaging method of any one of aspects 1-14, further comprising: generating, by the one or more processors, a modified image based on the at least one image, the modified image depicting instructions for how to treat the at least one feature with the manufactured product; and rendering, via the user interface of the user computing device, the modified image.

16. The digital imaging method of any one of aspects 1-15, further comprising: generating, by the one or more processors, a modified image based on the at least one image, the modified image depicting instructions for how to treat the at least one feature by applying the diaper to the individual's diaper change region in a particular manner; and rendering, via the user interface of the user computing device, the modified image.

17. The digital imaging method of any one of aspects 1-16, wherein the at least one individual-specific recommendation is rendered or transmitted for rendering in real-time or near-real time.

18. The digital imaging method of any one of aspects 1-17, wherein the diaper change region skin model is an artificial intelligence (AI) based model trained with at least one AI algorithm.

19. The digital imaging method of any one of aspects 1-18, wherein the diaper change region skin model is further trained, by the one or more processors, with the pixel data of the plurality of training images, to output one or more location identifiers indicating one or more corresponding body area locations of respective individuals, and wherein the diaper change region skin model, executing on the one or more processors and analyzing the at least one image of the individual, determines a location identifier indicating a body area location of the individual's skin.

20. The digital imaging method of any one of aspects 1-19, wherein the diaper change region comprises at least one of: the individual's perianal region, the individual's buttocks, the individual's genitals, the individual's hips, the individual's thighs, or the individual's waist, while the individual is wearing a diaper.

21. The digital imaging method of any one of aspects 1-20, wherein the diaper change region comprises at least one of: the individual's perianal region, the individual's buttocks, the individual's genitals, the individual's hips, the individual's thighs, or the individual's waist, while the individual is not wearing a diaper.

22. The digital imaging method of any one of aspects 1-21, wherein training the diaper change region skin model includes training the diaper change region skin model with indications of pixel data of the plurality of training images corresponding to one or more regions of interest.

23. The digital imaging method of any one of aspects 1-22, wherein training the diaper change region skin model includes training the diaper change region skin model with indications of pixel data of the plurality of training images corresponding to one or more of: a diaper change pad, a diaper changing area, or surrounding elements of the diaper changing area.

24. The digital imaging method of any one of aspects 1-23, wherein training the diaper change region skin model includes training the diaper change region skin model with indications of dimensions associated with the pixel data of the plurality of training images.

25. The digital imaging method of any one of aspects 1-24, wherein training the diaper change region skin model includes training the diaper change region skin model with indications of comparisons between two or more body areas associated with the pixel data of the plurality of training images.

26. The digital imaging method of any one of aspects 1-25, wherein training the diaper change region skin model includes training the diaper change region skin model with indications of comparisons between two or more body areas associated with the pixel data of the plurality of training images.

27. The digital imaging method of any one of aspects 1-26, wherein training the diaper change region skin model includes training the diaper change region skin model with indications of positions of the at least one feature identifiable within the pixel data of the individual's skin, in the plurality of training images.

28. The digital imaging method of any one of aspects 1-27, wherein training the diaper change region skin model includes training the diaper change region skin model with indications of colors associated with the pixel data of the plurality of training images.

29. The digital imaging method of aspect 28, wherein training the diaper change region skin model with indications of colors associated with the pixel data of the plurality of training images includes training the diaper change region skin model with indications of one or more of: colors associated with one or more diaper change region skin characteristics or colors associated with one or more diaper change region skin types.

30. The digital imaging method of aspect 29, wherein the one or more diaper change region skin types include Fitzpatrick skin types.

31. The digital imaging method of any one of aspects 1-30, wherein receiving the at least one image captured by a digital camera includes receiving at least one image captured by a digital camera and lit by a front-facing illumination assembly associated with the digital camera.

32. The digital imaging method of any one of aspects 1-31, wherein the one or more processors comprises at least one of a server or a cloud-based computing platform, and the server or the cloud-based computing platform receives the plurality of training images of the plurality of individuals via a computer network, and wherein the server or the cloud-based computing platform trains the diaper change region skin model with the pixel data of the plurality of training images.

33. The digital imaging method of any one of aspects 1-32, wherein the server or a cloud-based computing platform receives the at least one image comprising the pixel data of the diaper change region associated with the individual, and wherein the server or a cloud-based computing platform executes the diaper change region skin model and generates, based on output of the diaper change region skin model, the individual-specific recommendation and transmits, via the computer network, the individual-specific recommendation to the user computing device for rendering via the user interface of the user computing device.

34. The digital imaging method of any one of aspects 1-33, wherein the user computing device comprises a mobile device, a tablet, a handheld device, desktop device, a personal assistant device, a home assistant device, or a retail device.

35. The digital imaging method of any one of aspects 1-34, wherein the user computing device receives the at least one image comprising the pixel data of the at least a portion of the diaper change region associated with the individual, and wherein the user computing device executes the diaper change region skin model and generates, based on output of the diaper change region skin model, the individual-specific recommendation, and renders the individual-specific recommendation on via the user interface of the user computing device.

36. The digital imaging method of any one of aspects 1-35, wherein the individual-specific recommendation includes a recommended behavior selected, by the one or more processors, from at least two available behaviors based upon the diaper change region skin characteristic.

37. The digital method of any one of aspects 1-36, further comprising: receiving, at the one or more processors, a new image of the individual, the new image captured by the digital camera, and the new image comprising pixel data of the diaper change region associated with the individual; analyzing, by the diaper change region skin model executing on the one or more processors, the new image captured by the digital camera to determine a new individual-specific diaper change region skin characteristic; generating, based on the new individual-specific diaper change region skin characteristic, a new individual-specific recommendation regarding at least one feature identifiable within the pixel data of the new image; and rendering, via the user interface of a user computing device, the new individual-specific recommendation or comment.

38. The digital imaging method of aspect 37, wherein a delta diaper change region skin characteristic is generated based on a comparison between the new individual-specific diaper change region skin characteristic and the individual-specific diaper change region skin characteristic, wherein the new individual-specific recommendation is further based on the delta diaper change region skin characteristic, and wherein the delta diaper change region skin characteristic is rendered via the user interface of the user computing device.

39. The digital imaging method of any one of aspects 37 or 38, wherein the new image of the individual is captured after the image of the individual is captured.

40. The digital imaging method of aspect 39, wherein the new image of the individual is captured after a threshold amount of time has passed after the image of the individual is captured.

41. The digital imaging method of any one of aspects 1-40, wherein the at least one image comprises a plurality of images.

42. The digital imaging method of aspect 41, wherein the plurality of images are collected using a digital video camera.

43. The digital imaging method of any one of aspects 1-42, wherein the at least one image includes a three-dimensional image.

44. The digital imaging method of any one of aspects 1-43, wherein the diaper change region skin characteristic is based at least partially on an amount of the diaper change region affected by skin concerns.

45. The digital imaging method of any one of aspects 1-44, wherein the diaper change region skin characteristic is based at least partially on a severity of skin concerns affecting the diaper change region.

46. The digital imaging method of any one of aspects 1-45, wherein the at least one image is captured by a digital camera within a threshold timeframe after a diaper change.

47. The digital imaging method of any one of aspects 1-46, wherein the at least one image is captured by a digital camera within a threshold timeframe prior to a diaper change.

48. The digital imaging method of any one of aspects 1-47, wherein generating the at least one individual-specific recommendation designed to address at least one feature identifiable within the pixel data of the individual's skin is further based on one or more user inputs, made via the user interface, associated with the individual.

49. A digital imaging system configured to analyze pixel data of at least one image of a diaper change region associated with an individual for determining an individual-specific diaper change region skin characteristic, the digital imaging system comprising: an imaging server comprising a server processor and a server memory; an imaging application (app) configured to execute on a user computing device comprising a device processor and a device memory, the imaging app communicatively coupled to the imaging server; and a diaper change region skin model trained with pixel data of a plurality of training images of one or more diaper change regions associated with a respective plurality of individuals, and operable to determine diaper change region skin characteristics associated with a diaper change region based on the pixel data of the diaper change region, wherein the diaper change region skin model is configured to execute on the server processor or the device processor to cause the server processor or the device processor to: receive at least one image of an individual, the at least one image captured by a digital camera, and the at least one image comprising pixel data of the diaper change region associated with the individual; analyze, by the diaper change region skin model, the at least one image captured by the digital camera to determine an individual-specific diaper change region skin characteristic; generate, based on the individual-specific diaper change region skin characteristic, at least one individual-specific recommendation designed to address at least one feature identifiable within the pixel data of the individual's skin; and provide, via a user interface of a user computing device, the at least one individual-specific recommendation.

50. A tangible, non-transitory computer-readable medium storing instructions for analyzing pixel data of at least one image of a diaper change region associated with an individual for determining an individual-specific diaper change region skin characteristic, that when executed by one or more processors cause the one or more processors to: aggregate, at one or more processors communicatively coupled to one or more memories, a plurality of training images of one or more diaper change regions associated with a respective plurality of individuals, each of the training images comprising pixel data of a diaper change region associated with a respective individual; train, by the one or more processors, with the pixel data of the plurality of training images, a diaper change region skin model operable to determine diaper change region skin characteristics associated with a diaper change region based on the pixel data of the diaper change region; receive, at the one or more processors at least one image of an individual, the at least one image captured by a digital camera, and the at least one image comprising pixel data of the diaper change region associated with the individual; analyze, by the diaper change region skin model executing on the one or more processors, the at least one image captured by the digital camera to determine an individual-specific diaper change region skin characteristic; generate, by the one or more processors, based on the individual-specific diaper change region skin characteristic, at least one individual-specific recommendation designed to address at least one feature identifiable within the pixel data of the individual's skin; and provide, via a user interface of a user computing device, the at least one individual-specific recommendation.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A digital imaging method of analyzing pixel data of at least one image of a diaper change region associated with an individual for determining an individual-specific diaper change region skin characteristic, the digital imaging method comprising the steps of:

aggregating, at one or more processors communicatively coupled to one or more memories, a plurality of training images of one or more diaper change regions associated with a respective plurality of individuals, each of the training images comprising pixel data of a diaper change region associated with a respective individual;

training, by the one or more processors, with the pixel data of the plurality of training images, a diaper change region skin model operable to determine diaper change region skin characteristics associated with a diaper change region based on the pixel data of the diaper change region;

receiving, at the one or more processors at least one image of an individual, the at least one image captured by a digital camera, and the at least one image comprising pixel data of the diaper change region associated with the individual;

analyzing by the diaper change region skin model executing on the one or more processors, the at least one image captured by the digital camera to determine an individual-specific diaper change region skin characteristic;

generating, by the one or more processors, based on the individual-specific diaper change region skin characteristic, at least one individual-specific recommendation designed to address at least one feature identifiable within the pixel data of the individual's skin; and providing, via a user interface of a user computing device, the at least one individual-specific recommendation.

2. The digital imaging method of claim 1, wherein the plurality of training images include images comprising pixel data of the diaper change regions associated with the respective plurality of individuals from a plurality of perspectives.

3. The digital imaging method of claim 1, wherein the plurality of training images include images comprising pixel data of the diaper change regions associated with the respective plurality of individuals without depicting personally identifying information associated with the respective plurality of individuals.

4. The digital imaging method of claim 1, wherein the at least one individual-specific recommendation is displayed via the user interface of the user computing device with a graphical representation of the individual's skin as annotated with one or more graphics or textual renderings corresponding to the individual-specific diaper change region skin characteristic.

5. The digital imaging method of claim 1, wherein the at least one individual-specific recommendation is a textual recommendation displayed via the user interface of the user computing device.

6. The digital imaging method of claim 1, wherein the at least one individual-specific recommendation is an audio recommendation provided via the user interface of the user computing device.

7. The digital imaging method of claim 1, wherein the at least one individual-specific recommendation includes one or more of: a recommendation to use a mobile device application, a recommendation to practice one or more procedures associated with the diaper change region, a recommendation to seek or receive healthcare related to the diaper change region, or a recommendation of a lifestyle change related to the diaper change region.

8. The digital imaging method of claim 7, wherein the at least one individual-specific recommendation is displayed via the user interface of the user computing device with instructions for treating, with the manufactured product, the at least one feature identifiable within the pixel data of the individual's skin.

9. The digital imaging method of claim 1, wherein the at least one individual-specific recommendation is a recommendation for a visit with a healthcare provider.

10. The digital imaging method of claim 9, further comprising the steps of: initiating, by the one or more processors, based on the recommendation for the visit with the healthcare provider, a live chat or video with the healthcare provider.

11. The digital imaging method of claim 1, wherein the at least one individual-specific recommendation is a recommendation for a manufactured product.

12. The digital imaging method of claim 11, further comprising the steps of: initiating, by the one or more processors, based on the recommendation for the manufactured product, the manufactured product for shipment to an address associated with the individual.

13. The digital imaging method of claim 11, further comprising:
generating, by the one or more processors, a modified image based on the at least one image, the modified image depicting how the individual's diaper change region is predicted to appear after treating the at least one feature with the manufactured product; and rendering, via the user interface of the user computing device, the modified image.

14. The digital imaging method of claim 13, wherein rendering the modified image includes rendering the modified image in an augmented reality (AR) format.

15. The digital imaging method of claim 1, further comprising:
generating, by the one or more processors, a modified image based on the at least one image, the modified image depicting instructions for how to treat the at least one feature with the manufactured product; and
rendering, via the user interface of the user computing device, the modified image.

16. The digital imaging method of claim 1, further comprising:
generating, by the one or more processors, a modified image based on the at least one image, the modified image depicting instructions for how to treat the at least one feature by applying the diaper to the individual's diaper change region in a particular manner; and
rendering, via the user interface of the user computing device, the modified image.

17. The digital imaging method of claim 1, wherein the at least one individual-specific recommendation is rendered or transmitted for rendering in real-time or near-real time.

18. The digital imaging method of claim 1, wherein the diaper change region skin model is an artificial intelligence (AI) based model trained with at least one AI algorithm.

19. The digital imaging method of claim 1,
wherein the diaper change region skin model is further trained, by the one or more processors, with the pixel data of the plurality of training images, to output one or more location identifiers indicating one or more corresponding body area locations of respective individuals, and
wherein the diaper change region skin model, executing on the one or more processors and analyzing the at least one image of the individual, determines a location identifier indicating a body area location of the individual's skin.

20. The digital imaging method of claim 1, wherein the diaper change region comprises at least one of: the individual's perianal region, the individual's buttocks, the individual's genitals, the individual's hips, the individual's thighs, or the individual's waist, while the individual is wearing a diaper.

21. The digital imaging method of claim 1, wherein the diaper change region comprises at least one of: the individual's perianal region, the individual's buttocks, the individual's genitals, the individual's hips, the individual's thighs, or the individual's waist, while the individual is not wearing a diaper.

22. The digital imaging method of claim 1, wherein training the diaper change region skin model includes training the diaper change region skin model with indications of pixel data of the plurality of training images corresponding to one or more regions of interest.

23. The digital imaging method of claim 1, wherein training the diaper change region skin model includes training the diaper change region skin model with indications of pixel data of the plurality of training images corresponding to one or more of: a diaper change pad, a diaper changing area, or surrounding elements of the diaper changing area.

24. The digital imaging method of claim 1, wherein training the diaper change region skin model includes training the diaper change region skin model with indications of dimensions associated with the pixel data of the plurality of training images.

25. The digital imaging method of claim 1, wherein training the diaper change region skin model includes training the diaper change region skin model with indications of comparisons between two or more body areas associated with the pixel data of the plurality of training images.

26. The digital imaging method of claim 1, wherein training the diaper change region skin model includes training the diaper change region skin model with indications of comparisons between two or more body areas associated with the pixel data of the plurality of training images.

27. The digital imaging method of claim 1, wherein training the diaper change region skin model includes training the diaper change region skin model with indications of positions of the at least one feature identifiable within the pixel data of the individual's skin, in the plurality of training images.

28. The digital imaging method of claim 1, wherein training the diaper change region skin model includes training the diaper change region skin model with indications of colors associated with the pixel data of the plurality of training images.

29. The digital imaging method of claim 28, wherein training the diaper change region skin model with indications of colors associated with the pixel data of the plurality of training images includes training the diaper change region skin model with indications of one or more of: colors associated with one or more diaper change region skin characteristics or colors associated with one or more diaper change region skin types.

30. The digital imaging method of claim 29, wherein the one or more diaper change region skin types include Fitzpatrick skin types.

31. The digital imaging method of claim 1, wherein receiving the at least one image captured by a digital camera includes receiving at least one image captured by a digital camera and lit by a front-facing illumination assembly associated with the digital camera.

32. The digital imaging method of claim 1, wherein the one or more processors comprises at least one of a server or a cloud-based computing platform, and the server or the cloud-based computing platform receives the plurality of training images of the plurality of individuals via a computer network, and wherein the server or the cloud-based computing platform trains the diaper change region skin model with the pixel data of the plurality of training images.

33. The digital imaging method of claim 32, wherein the server or a cloud-based computing platform receives the at least one image comprising the pixel data of the diaper change region associated with the individual, and wherein the server or a cloud-based computing platform executes the diaper change region skin model and generates, based on output of the diaper change region skin model, the individual-specific recommendation and transmits, via the computer network, the individual-specific recommendation to the user computing device for rendering via the user interface of the user computing device.

34. The digital imaging method of claim 1, wherein the user computing device comprises a mobile device, a tablet, a handheld device, desktop device, a personal assistant device, a home assistant device, or a retail device.

35. The digital imaging method of claim 1, wherein the user computing device receives the at least one image comprising the pixel data of the at least a portion of the diaper change region associated with the individual, and wherein the user computing device executes the diaper change region skin model and generates, based on output of the diaper change region skin model, the individual-specific recommendation, and renders the individual-specific recommendation on via the user interface of the user computing device.

36. The digital imaging method of claim 1, wherein the individual-specific recommendation includes a recommended behavior selected, by the one or more processors, from at least two available behaviors based upon the diaper change region skin characteristic.

37. The digital method of claim 1, further comprising:
receiving, at the one or more processors, a new image of the individual, the new image captured by the digital camera, and the new image comprising pixel data of the diaper change region associated with the individual;
analyzing, by the diaper change region skin model executing on the one or more processors, the new image captured by the digital camera to determine a new individual-specific diaper change region skin characteristic;
generating, based on the new individual-specific diaper change region skin characteristic, a new individual-specific recommendation regarding at least one feature identifiable within the pixel data of the new image; and
rendering, via the user interface of a user computing device, the new individual-specific recommendation or comment.

38. The digital imaging method of claim 37, wherein a delta diaper change region skin characteristic is generated based on a comparison between the new individual-specific diaper change region skin characteristic and the individual-specific diaper change region skin characteristic, wherein the new individual-specific recommendation is further based on the delta diaper change region skin characteristic, and wherein the delta diaper change region skin characteristic is rendered via the user interface of the user computing device.

39. The digital imaging method of claim 37, wherein the new image of the individual is captured after the image of the individual is captured.

40. The digital imaging method of claim 39, wherein the new image of the individual is captured after a threshold amount of time has passed after the image of the individual is captured.

41. The digital imaging method of claim 1, wherein the at least one image comprises a plurality of images.

42. The digital imaging method of claim 41, wherein the plurality of images are collected using a digital video camera.

43. The digital imaging method of claim 1, wherein the at least one image includes a three-dimensional image.

44. The digital imaging method of claim 1, wherein the diaper change region skin characteristic is based at least partially on an amount of the diaper change region affected by skin concerns.

45. The digital imaging method of claim 1, wherein the diaper change region skin characteristic is based at least partially on a severity of skin concerns affecting the diaper change region.

46. The digital imaging method of claim 1, wherein the at least one image is captured by a digital camera within a threshold timeframe after a diaper change.

47. The digital imaging method of claim 1, wherein the at least one image is captured by a digital camera within a threshold timeframe prior to a diaper change.

48. The digital imaging method of claim 1, wherein generating the at least one individual-specific recommendation designed to address at least one feature identifiable within the pixel data of the individual's skin is further based on one or more user inputs, made via the user interface, associated with the individual.

49. A digital imaging system configured to analyze pixel data of at least one image of a diaper change region associated with an individual for determining an individual-specific diaper change region skin characteristic, the digital imaging system comprising:
an imaging server comprising a server processor and a server memory;
an imaging application (app) configured to execute on a user computing device comprising a device processor and a device memory, the imaging app communicatively coupled to the imaging server; and
a diaper change region skin model trained with pixel data of a plurality of training images of one or more diaper change regions associated with a respective plurality of individuals, and operable to determine diaper change region skin characteristics associated with a diaper change region based on the pixel data of the diaper change region,
wherein the diaper change region skin model is configured to execute on the server processor or the device processor to cause the server processor or the device processor to:
receive at least one image of an individual, the at least one image captured by a digital camera, and the at least one image comprising pixel data of the diaper change region associated with the individual;
analyze, by the diaper change region skin model, the at least one image captured by the digital camera to determine an individual-specific diaper change region skin characteristic;
generate, based on the individual-specific diaper change region skin characteristic, at least one individual-specific recommendation designed to address at least one feature identifiable within the pixel data of the individual's skin; and
provide, via a user interface of a user computing device, the at least one individual-specific recommendation.

50. A tangible, non-transitory computer-readable medium storing instructions for analyzing pixel data of at least one image of a diaper change region associated with an individual for determining an individual-specific diaper change region skin characteristic, that when executed by one or more processors cause the one or more processors to:

aggregate, at one or more processors communicatively coupled to one or more memories, a plurality of training images of one or more diaper change regions associated with a respective plurality of individuals, each of the training images comprising pixel data of a diaper change region associated with a respective individual;

train, by the one or more processors, with the pixel data of the plurality of training images, a diaper change region skin model operable to determine diaper change region skin characteristics associated with a diaper change region based on the pixel data of the diaper change region;

receive, at the one or more processors at least one image of an individual, the at least one image captured by a digital camera, and the at least one image comprising pixel data of the diaper change region associated with the individual;

analyze, by the diaper change region skin model executing on the one or more processors, the at least one image captured by the digital camera to determine an individual-specific diaper change region skin characteristic;

generate, by the one or more processors, based on the individual-specific diaper change region skin characteristic, at least one individual-specific recommendation designed to address at least one feature identifiable within the pixel data of the individual's skin; and provide, via a user interface of a user computing device, the at least one individual-specific recommendation.

* * * * *